(12) United States Patent
Holland et al.

(10) Patent No.: US 12,077,307 B2
(45) Date of Patent: Sep. 3, 2024

(54) METHODS INVOLVING AND APPARATUSES FOR A TURBINE ENGINE FAIRING

(71) Applicant: Raytheon Technologies Corporation, Farmington, CT (US)

(72) Inventors: Brian K. Holland, Mason, MI (US); Patrick B. Mayabb, Eaton Rapids, MI (US); William Bogue, Hebron, CT (US); Kerry L. Davis, Wethersfield, CT (US); Jeffrey Denton, Jackson, MI (US)

(73) Assignee: RTX CORPORATION, Farmington, CT (US)

( * ) Notice: Subject to any disclaimer, the term of this patent is extended or adjusted under 35 U.S.C. 154(b) by 18 days.

(21) Appl. No.: 17/497,522

(22) Filed: Oct. 8, 2021

(65) Prior Publication Data
US 2023/0114262 A1    Apr. 13, 2023

(51) Int. Cl.
*B64D 29/00*        (2006.01)
*F01D 25/24*        (2006.01)
*F02K 1/82*         (2006.01)
*F02K 3/06*         (2006.01)

(52) U.S. Cl.
CPC ............. *B64D 29/00* (2013.01); *F01D 25/24* (2013.01); *F02K 1/82* (2013.01); *F02K 3/06* (2013.01); *F05D 2220/323* (2013.01); *F05D 2220/36* (2013.01); *F05D 2230/31* (2013.01); *F05D 2240/14* (2013.01); *F05D 2300/603* (2013.01)

(58) Field of Classification Search
CPC .......... F01D 11/008; F01D 5/225; F01D 5/30; F01D 5/02; F01D 25/24; F05D 2300/603; F05D 2220/36; F05D 2260/30; B64D 29/00; F02K 1/82; F02K 3/06
See application file for complete search history.

(56) References Cited

U.S. PATENT DOCUMENTS

| | | |
|---|---|---|
| 5,876,651 A | 3/1999 | Blackburn, Jr. |
| 6,217,283 B1 * | 4/2001 | Ravenhall ............... F01D 5/225 416/193 A |
| 8,206,526 B2 | 6/2012 | Baril |
| 8,545,959 B2 | 10/2013 | McGuire, Jr. |
| 9,976,426 B2 * | 5/2018 | Turner .................... B29C 70/70 |
| 10,391,722 B1 * | 8/2019 | Traustadottir ..... B29D 99/0025 |
| 10,472,048 B2 * | 11/2019 | Kling ...................... B29C 70/14 |
| 11,268,396 B2 * | 3/2022 | Karkos ................ F01D 11/008 |
| 2007/0079920 A1 | 4/2007 | Holland |

(Continued)

OTHER PUBLICATIONS

EP search report for EP22200426.9 dated Jun. 12, 2023.

*Primary Examiner* — Craig Kim
(74) *Attorney, Agent, or Firm* — Getz Balich LLC (57) ABSTRACT

A method is provided involving a fairing for a turbine engine. During this method, a detail is provided. The detail includes a carrier and an exterior layer bonded to the carrier. The carrier is configured from or otherwise includes fiber-reinforced composite material. The exterior layer is configured from or otherwise includes polymer material. The detail is arranged with the fairing. The fairing includes an exterior side and an edge. The detail covers and extends along at least a portion of the exterior side. The detail wraps at least partially around the edge. The carrier and at least a first overhang portion of the exterior layer are bonded to the fairing.

15 Claims, 12 Drawing Sheets

(56) References Cited

U.S. PATENT DOCUMENTS

| | | | |
|---|---|---|---|
| 2008/0000193 A1 | 1/2008 | Holland | |
| 2008/0018056 A1* | 1/2008 | Evans | F01D 11/008 277/590 |
| 2008/0248300 A1 | 10/2008 | Bogue | |
| 2012/0156049 A1 | 6/2012 | Hong | |
| 2014/0271143 A1* | 9/2014 | Feeney | F01D 11/008 264/254 |
| 2017/0022824 A1 | 1/2017 | Turner | |
| 2017/0023007 A1 | 1/2017 | Roche | |
| 2017/0334547 A1 | 11/2017 | Holland | |
| 2018/0100044 A1* | 4/2018 | Baron | C08L 77/06 |
| 2019/0112934 A1* | 4/2019 | Heeter | F01D 11/008 |
| 2020/0355082 A1 | 11/2020 | Theertham | |
| 2021/0222576 A1* | 7/2021 | Karkos | F01D 11/008 |

\* cited by examiner

METHODS INVOLVING AND APPARATUSES FOR A TURBINE ENGINE FAIRING

BACKGROUND OF THE DISCLOSURE

1. Technical Field

This disclosure relates generally to a turbine engine and, more particularly, to a fairing for the turbine engine.

2. Background Information

A turbofan turbine engine includes a fan rotor. The fan rotor may include a plurality of fan rotor fairings forming an inner peripheral flowpath boundary through fan rotor. These fan rotor fairing may be susceptible to damage by foreign objects; e.g., debris such as sand, dirt, ice, etc. Such foreign object damage may erode and/or otherwise damage an erosion coating over a fan rotor fairing. Replacement of a fan rotor fairing is expensive, and repair of a fan rotor fairing may be difficult with known recoating processes.

SUMMARY OF THE DISCLOSURE

According to an aspect of the present disclosure, a method is provided involving a fairing for a turbine engine. During this method, a detail is provided. The detail includes a carrier and an exterior layer bonded to the carrier. The carrier is configured from or otherwise includes fiber-reinforced composite material. The exterior layer is configured from or otherwise includes polymer material. The detail is arranged with the fairing. The fairing includes an exterior side and an edge. The detail covers and extends along at least a portion of the exterior side. The detail wraps at least partially around the edge. The carrier and at least a first overhang portion of the exterior layer are bonded to the fairing.

According to another aspect of the present disclosure, a method is provided involving a fairing for a turbine engine. During this method, carrier material is disposed on a mold. The carrier material is configured from or otherwise includes uncured fiber-reinforced composite material. Exterior layer material is disposed over the carrier material to provide an assembly. The exterior layer material may be configured as or otherwise include uncured polymer material. The assembly is subjected to a cure cycle to: bond the exterior layer material to the carrier material; cure the uncured fiber-reinforced composite material to provide fiber-reinforced composite material; and cure the uncured polymer material to provide polymer material. The fiber-reinforced composite material forms a carrier of a detail for the fairing. The polymer material forms an exterior layer of the detail. The detail is configured with a hooked sectional geometry.

According to still another aspect of the present disclosure, an apparatus is provided for a turbine engine. This apparatus includes a fairing and a detail. The fairing includes an exterior side, a leading edge, a first lateral edge and a second lateral edge. The exterior side extends longitudinally to the leading edge. The exterior side extends laterally between the first lateral edge and the second lateral edge. The detail covers at least a portion of the exterior side. The detail extends at least partially about the leading edge. The detail extends at least partially about the first lateral edge. The detail extends at least partially about the second lateral edge. The detail includes fiber-reinforced composite material and polymer material. The fiber-reinforced composite material is bonded to the fairing. A first portion of the polymer material is bonded to the fiber-reinforced composite material. A second portion of the polymer material is bonded to the fairing.

The apparatus may also include a first fan blade and a second fan blade. The fairing may be arranged laterally between the first fan blade and the second fan blade to form a fan platform segment laterally between the first fan blade and the second fan blade.

A portion of the exterior layer may project out from and is unsupported by the carrier.

The detail may be arranged with the fairing. The detail may be wrapped at least partially around a leading edge of the fairing. The fiber-reinforced composite material and at least a portion of the polymer material may be bonded to the fairing.

The fairing may also include an interior side located opposite the exterior side. The detail may extend around the edge from the exterior side to the interior side.

The detail may cover and extend along at least a portion of the interior side.

The carrier may be bonded to the exterior side and the interior side.

The carrier may be bonded to the exterior side. The first overhang portion of the exterior layer may be bonded to the interior side.

The carrier may be bonded to the exterior side and the edge.

The carrier may be bonded to the exterior side. The first overhang portion of the exterior layer may be bonded to the edge.

The carrier may be bonded to the exterior side. The first overhang portion of the exterior layer may be bonded to the exterior side.

The first overhang portion of the exterior layer may project past an end of the carrier. The first overhang portion of the exterior layer may cover and may be bonded to an exterior surface region of the fairing adjacent the edge. The exterior surface region may have a concave curvature.

The fairing may include a turn-down region at the edge. The turn-down region may include the exterior surface region.

The end of the carrier may be located at an end of the fairing and/or the edge of the fairing.

The edge may be a leading edge of the fairing. The fairing may also include a first lateral edge and a second lateral edge located opposite the first lateral edge. The detail may wrap at least partially around the first lateral edge and the second lateral edge.

The fairing may be configured as a platform segment for the turbine engine.

The fairing may be arranged laterally between a first fan blade and a second fan blade. The fairing may form a platform segment of a fan rotor.

The fiber-reinforced composite material may be configured from or otherwise include fiberglass within a resin matrix. The polymer material may be configured from or otherwise include flouroelastomer material.

The providing of the detail may include: disposing a sheet of uncured fiber-reinforced composite material on a mold; disposing a sheet of uncured polymer material over the sheet of uncured fiber-reinforced composite material; and subject an assembly of the mold, the sheet of uncured polymer material and the sheet of uncured fiber-reinforced composite material to a cure cycle to: bond the sheet of uncured polymer material to the sheet of uncured fiber-reinforced composite material; cure the sheet of uncured polymer material; and cure the sheet of uncured fiber-reinforced composite material.

The method may also include disposing adhesive with the fairing. The adhesive may be between the fairing and the detail. The bonding may include curing the adhesive to bond the detail to the fairing.

During the method, coating material may be removed from the fairing to expose fairing material along the edge and at least a portion of the exterior side, the coating material comprising polymer material, and the fairing material comprising fiber-reinforced composite material. The detail may be bonded to the exposed fairing material during the bonding of the carrier and the first overhang portion of the exterior layer.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
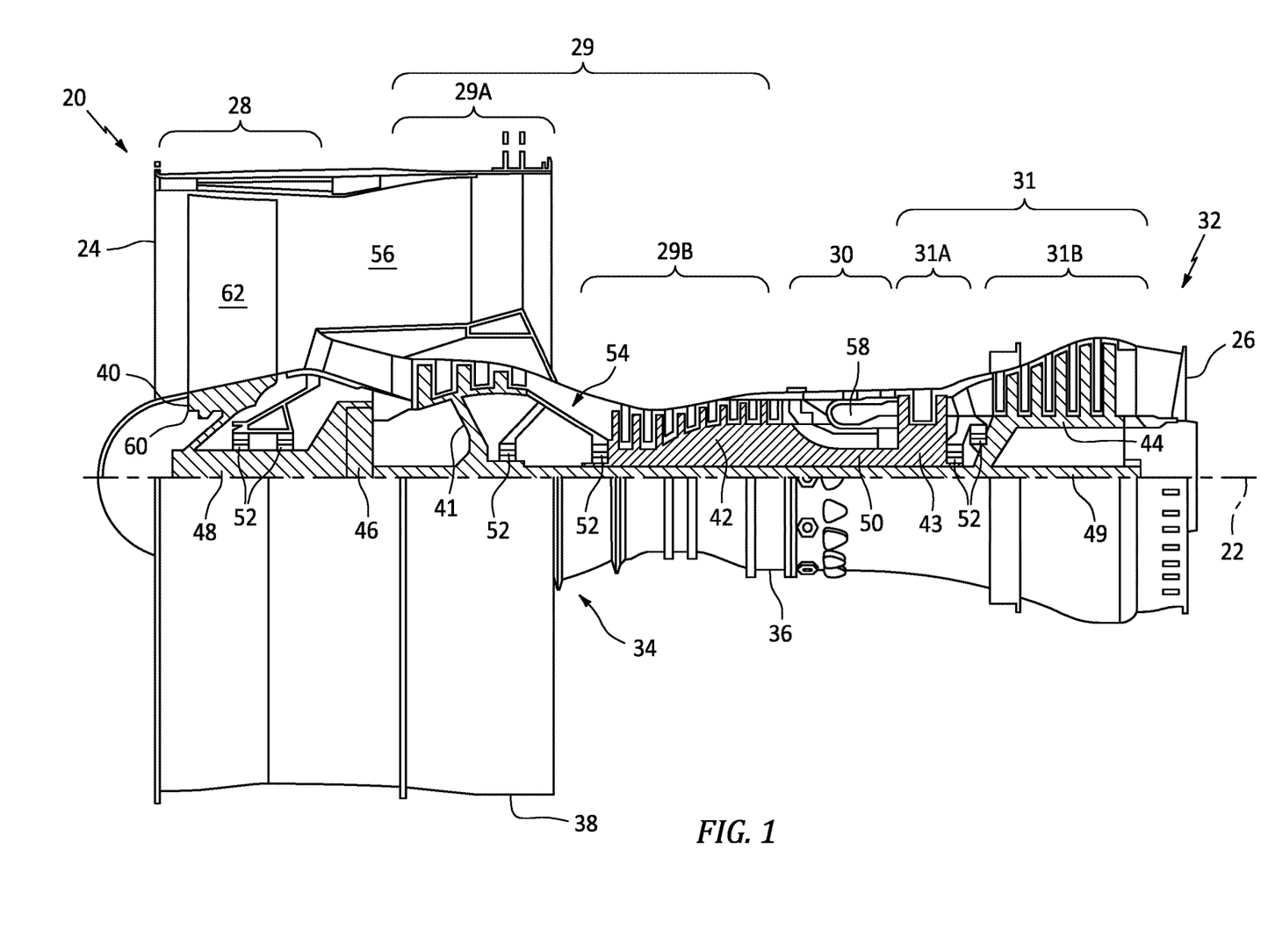
FIG. 1 is a side cutaway illustration of a geared turbine engine.

FIG. 1 is a side cutaway illustration of a geared turbine engine 20. This turbine engine 20 extends along an axial centerline 22 between a forward, upstream airflow inlet 24 and an aft, downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., an engine core. The outer case 38 may house at least the fan section 28.

Each of the engine sections 28, 29A, 29B, 31A and 31B includes a respective rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a gear train 46, for example, through a fan shaft 48. The gear train 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the turbine engine 20 through the airflow inlet 24. This air is directed through the fan section 28 and into a core flowpath 54 and a bypass flowpath 56. The core flowpath 54 extends sequentially through the engine sections 29A-31B. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which propels bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

Figure 2:
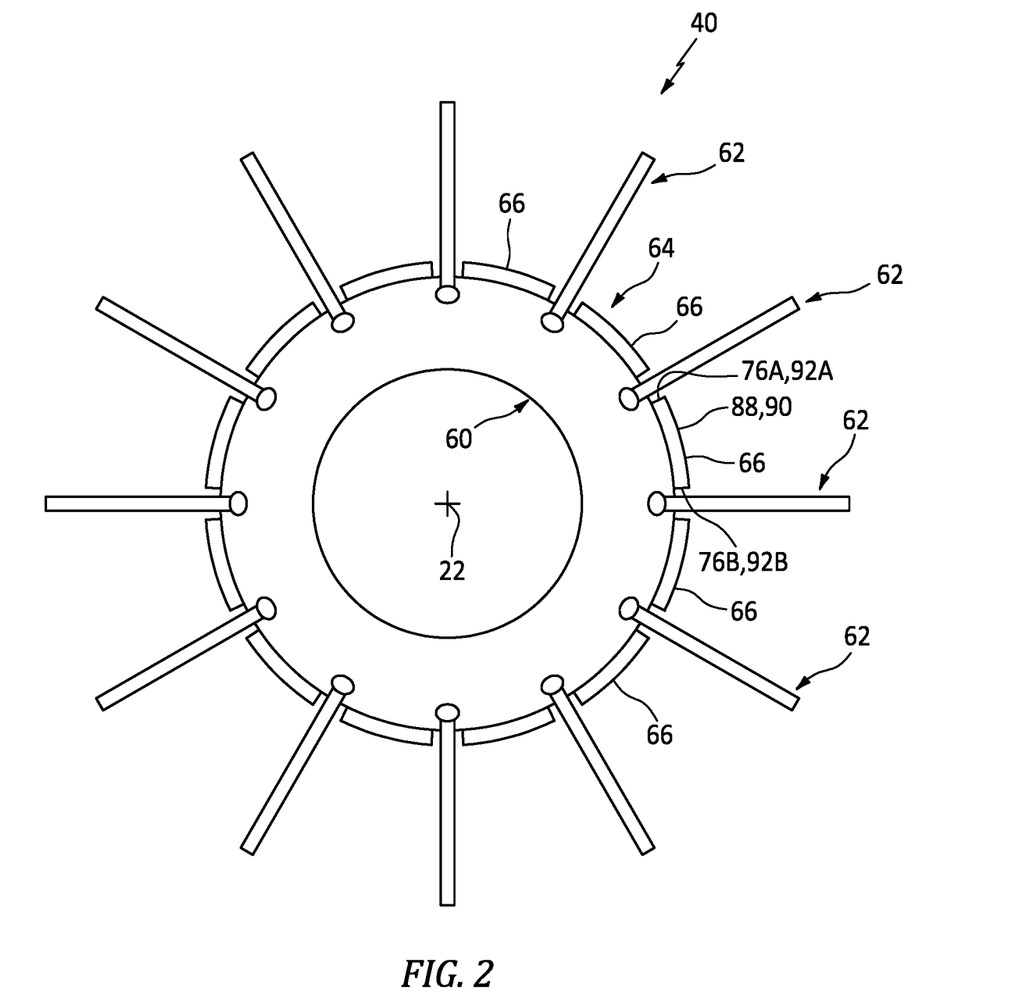
FIG. 2 is a schematic end view illustration of a fan rotor.

FIG. 2 is a schematic end view illustration of the fan rotor 40. This fan rotor 40 includes its fan rotor disk 60 ("fan disk") and its plurality of fan rotor blades 62 ("fan blades"). The fan blades 62 are arranged circumferentially around and connected to the fan disk 60 as described above. The fan rotor 40 of FIG. 2 also includes an inner fan platform 64.

The fan platform 64 is a generally tubular (e.g., segmented, frustoconical) body configured to form an inner peripheral boundary for fluid flow (e.g., airflow) through the fan rotor 40 from the airflow inlet 24 to the flowpaths 54 and 56 (see FIG. 1). The fan platform 64 of FIG. 2 includes a plurality of inter-blade fan rotor fairings 66. These rotor fairings 66 are arranged circumferentially around and connected to the fan disk 60, where the rotor fairings 66 are interspersed with the fan blades 62. Each rotor fairing 66 of FIG. 2, for example, is arranged laterally (e.g., circumferentially) between a respective pair of laterally neighboring (e.g., adjacent) fan blades 62. Similarly, each fan blade 62 of FIG. 2 is arranged laterally between a respective pair of laterally neighboring rotor fairings 66. With this arrangement, each rotor fairing 66 forms a segment of the fan platform 64; e.g., a platform segment.

Figure 3:
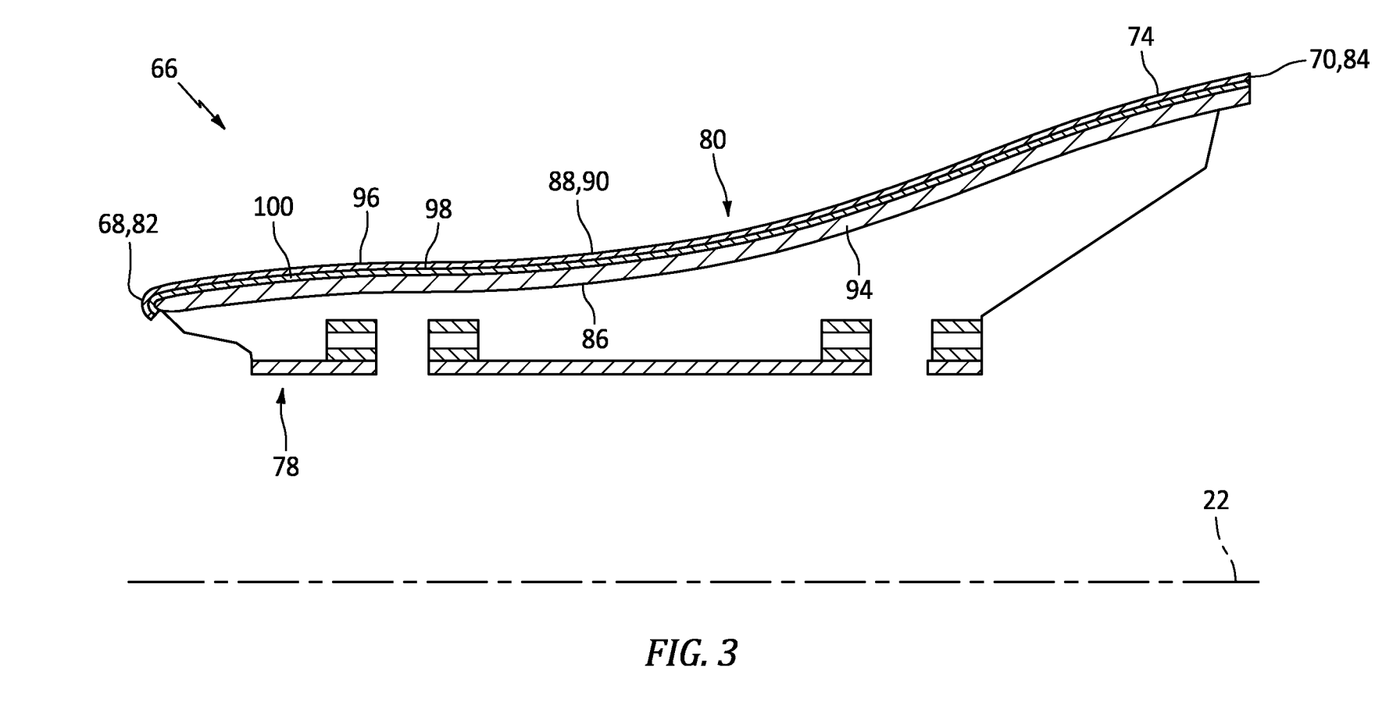
FIG. 3 is a side sectional illustration of a fan rotor fairing.
Figure 4:
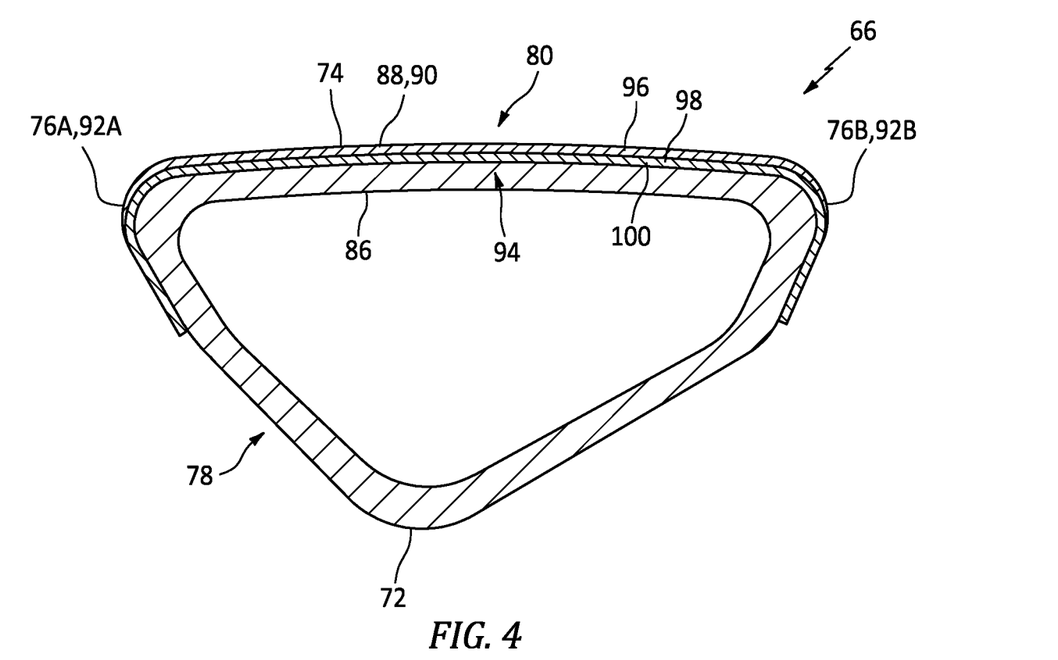
FIG. 4 is a cross-sectional illustration of the fan rotor fairing.

Referring to FIG. 3, each rotor fairing 66 extends axially along the axial centerline 22 between and to a forward, upstream end 68 of the respective rotor fairing 66 and an aft, downstream end 70 of the respective rotor fairing 66. Each rotor fairing 66 extends radially outward from an inner side 72 of the respective rotor fairing 66 to an outer side 74 of the respective rotor fairing 66. Referring to FIG. 4, each rotor fairing 66 extends between and to a lateral first side 76A of the respective rotor fairing 66 and a lateral second side 76B of the respective rotor fairing 66, which fairing first side 76A is located laterally opposite the fairing second side 76B.

Each rotor fairing 66 of FIGS. 3 and 4 includes an inner fairing mount 78 and an outer fairing platform 80 connected to (e.g., formed integral with) the fairing mount 78. The fairing mount 78 is arranged at the fairing inner side 72. The fairing mount 78 is configured to attach the respective rotor fairing 66 to the fan disk 60; e.g., see FIG. 2. The fairing platform 80 is arranged at the fairing outer side 74. The fairing platform 80 is configured to form a lateral segment of the inner peripheral boundary for fluid flow through the fan rotor 40; see also FIG. 2.

The fairing platform 80 of FIG. 3 extends axially between and to a leading edge 82 of the rotor fairing 66 and a trailing edge 84 of the rotor fairing 66. The fairing leading edge 82 is located at the fairing upstream end 68 and the fairing outer side 74. The fairing trailing edge 84 is located at the fairing downstream end 70 and the fairing outer side 74.

The fairing platform 80 of FIG. 3 extends radially between and to an interior side 86 of the fairing platform 80 and an exterior side 88 of the fairing platform 80, which platform exterior side 88 is located radially opposite the platform interior side 86. The platform exterior side 88 of FIG. 3 forms an exterior flowpath surface 90 of the respective rotor fairing 66.

Referring to FIG. 4, the fairing platform 80 extends laterally between and to a first lateral edge 92A of the respective rotor fairing 66 and a second lateral edge 92B of the respective rotor fairing 66. The fairing first lateral edge 92A is located at the fairing first side 76A and the fairing outer side 74. The fairing first lateral edge 92A is configured to laterally abut against or otherwise be disposed laterally adjacent one of the fan blades 62; e.g., see FIG. 2. This first lateral edge 92A of FIG. 4 may also form a first corner between the fairing platform 80 and the fairing mount 78. The fairing second lateral edge 92B is located at the fairing second side 76B and the fairing outer side 74. The fairing second lateral edge 92B is configured to laterally abut against or otherwise be disposed laterally another adjacent one of the fan blades 62; e.g., see FIG. 2. This second lateral edge 92B of FIG. 4 may also form a second corner between the fairing platform 80 and the fairing mount 78.

Each rotor fairing 66 of FIGS. 3 and 4 is configured with a (e.g., monolithic) fairing body. This fairing body includes a fairing base 94 (e.g., a core) configured to provide the respective rotor fairing 66 with its general configuration; e.g., shape, structure, etc. The fairing body of FIGS. 3 and 4 also includes an exterior coating 96 and at least one intermediate member 98; e.g., an interlayer. The exterior coating 96 of FIGS. 3 and 4 covers and is bonded (e.g., directly) onto the intermediate member 98. The intermediate member 98 of FIGS. 3 and 4 covers and is bonded onto the fairing base 94 via, for example, an adhesive layer 100. The intermediate member 98 thereby provides a buffer between the fairing base 94 and the exterior coating 96 as well as additional protection for the underlying material—the fairing base 94.

A system of the layers 96 and 98 ("layered system") of FIGS. 3 and 4 may completely (or partially) cover the underlying fairing base 94 at the fairing outer side 74. The layered system may thereby form the platform exterior side 88 and its exterior flowpath surface 90. The layered system of FIG. 3 extends at least partially around (e.g., wraps around) the underlying fairing base 94 at the fairing upstream end 68. The layered system may thereby at least partially form the fairing leading edge 82. The layered system of FIG. 4 extends around the underlying fairing base 94 at each side 76A, 76B (generally referred to as "76"), and may project over a respective portion of the fairing mount 78. The layered system may thereby form each fairing lateral edge 92A, 92B (generally referred to as "92").

The fairing base 94 is formed from fairing base material. This fairing base material may be fiber-reinforced composite material such as, but not limited to, carbon fiber within a resin matrix. The intermediate member 98 is formed from intermediate member material. This intermediate member material may be fiber-reinforced composite material such as, but not limited to, fiberglass within a resin matrix. The exterior coating 96 is formed from a polymeric exterior coating material; e.g., erosion coating material. This exterior coating material may be a fluoropolymer and, more particularly, a fluoropolymer elastomer and synthetic rubber compound such as, but not limited to, Viton™ material produced by Dupont of Wilmington, Delaware, United States. The present disclosure, however, is not limited to the foregoing exemplary rotor fairing materials.

Figure 5:
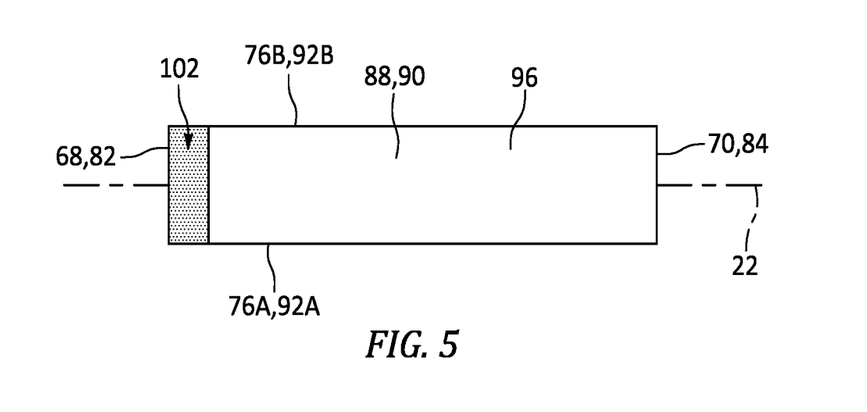
FIG. 5 is a schematic side view illustration of the fan rotor fairing with a leading edge portion subject to foreign object damage (FOD).

During operation of the turbine engine 20 of FIG. 1, foreign objects (e.g., debris such as dirt, sand, ice, etc.) may enter the airflow inlet 24. These foreign objects may pit, scratch, erode and/or otherwise damage one or more exposed areas of one or more of the rotor fairings 66 of FIGS. 3 and 4. For example, referring to FIG. 5, a portion 102 of the exterior coating 96 proximate the fairing leading edge 82 may be particularly degraded from the foreign object damage (FOD). The present disclosure includes methods and devices for repairing such FOD effected areas of the rotor fairing 66.

Figure 6:
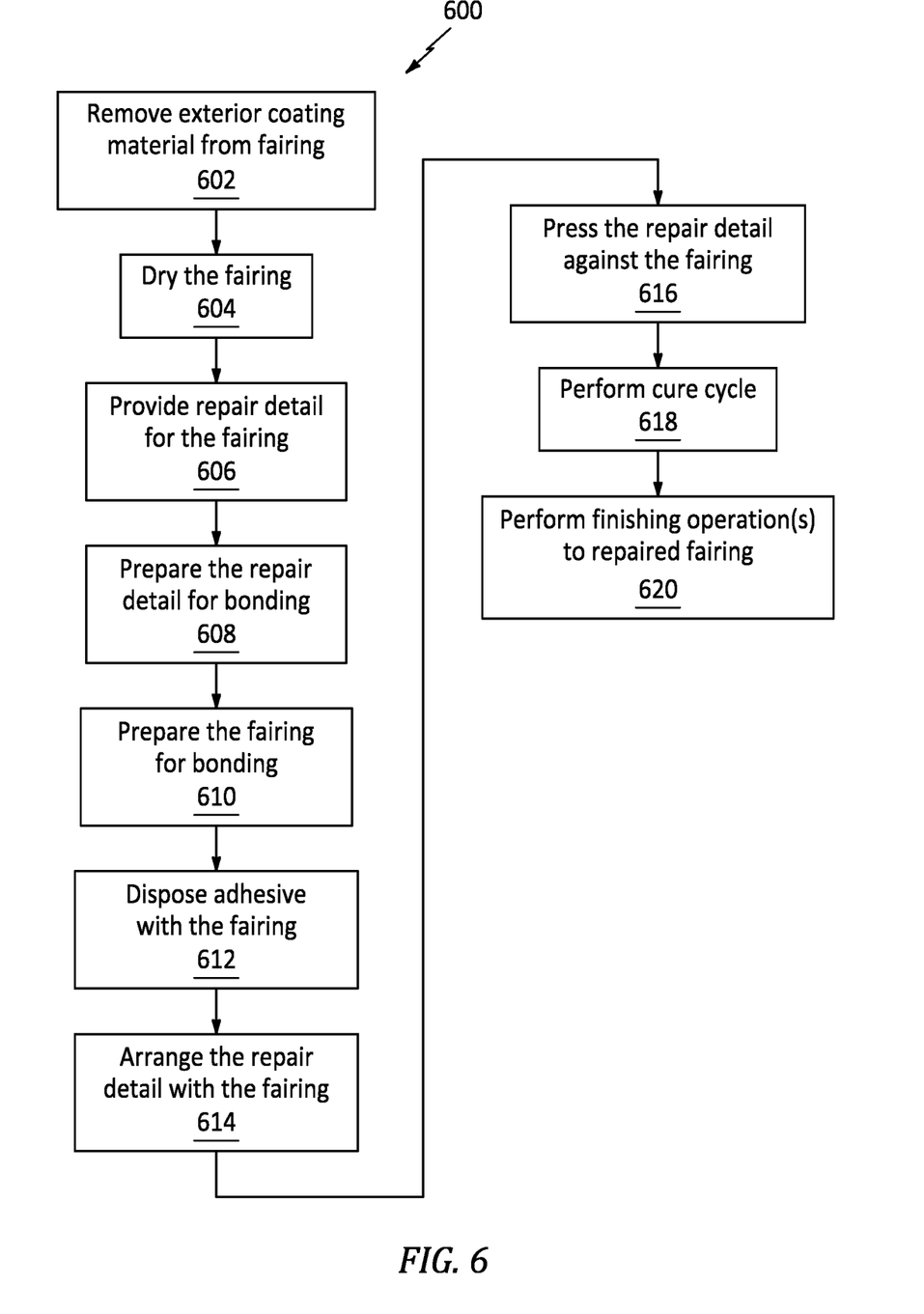
FIG. 6 is a flow diagram of a method for repairing a damaged fan rotor fairing.

FIG. 6 is a flow diagram of a method 600 for repairing a damaged rotor fairing. For ease of description, the method 600 is described below with respect to the rotor fairing 66 described above. The method 600 of the present disclosure, however, is not limited to repairing such an exemplary rotor fairing.

Figure 7A:
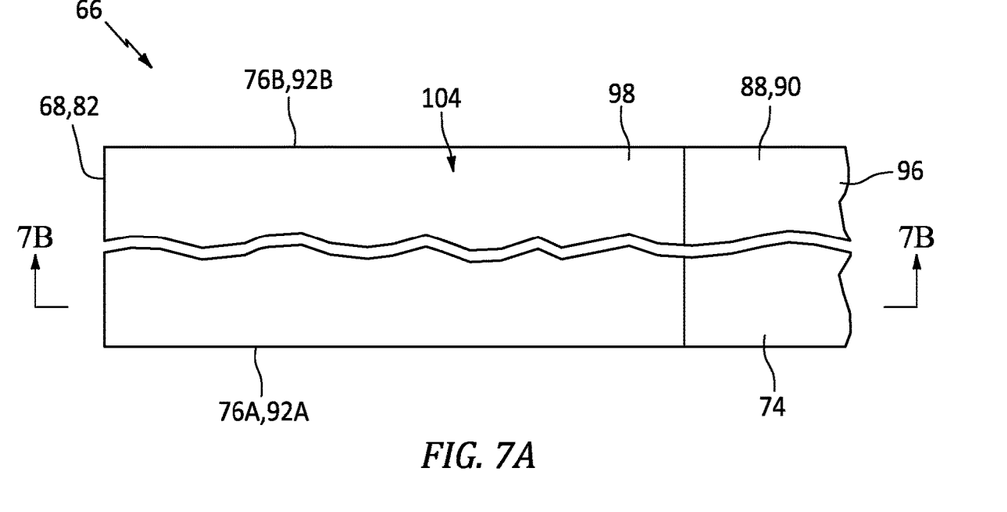
FIG. 7A is a partial schematic side view illustration of the fan rotor fairing with a removed section of exterior coating material.
Figure 7B:
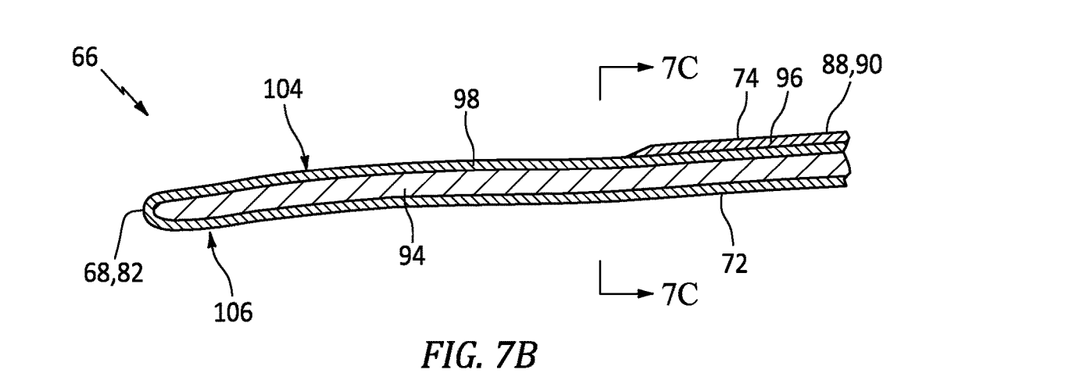
FIG. 7B is a partial side sectional illustration of the fan rotor fairing taken along line 7B-7B in FIG. 7A.
Figure 7C:
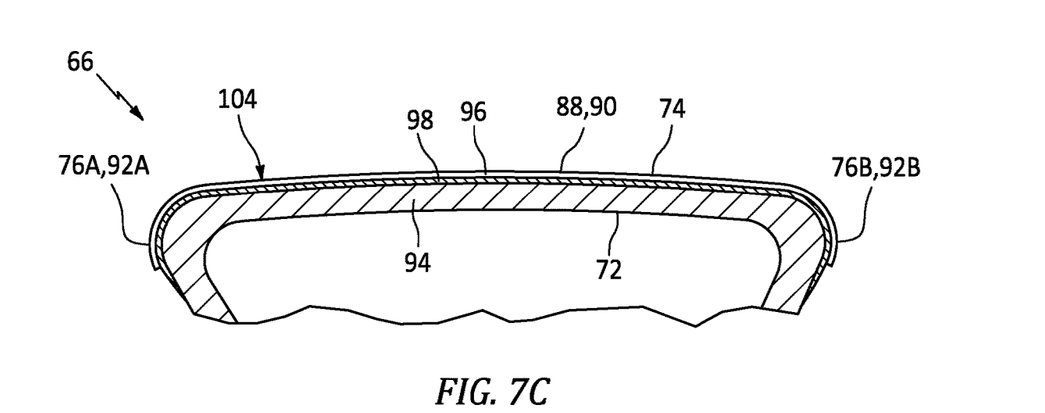
FIG. 7C is a partial cross-sectional illustration of the fan rotor fairing taken along line 7C-7C in FIG. 7B.

In step 602, at least a portion of the exterior coating 96 is removed from the rotor fairing 66. For example, referring to FIG. 7A-C, the exterior coating material in an upstream region 104 of the platform exterior side 88 is removed. This upstream region 104 of FIG. 7A extends axially to the fairing leading edge 82 and laterally between the fairing lateral edges 92A and 92B. Referring to FIG. 7B, the exterior coating material at/along the fairing leading edge 82 may be removed. For example, the exterior coating material in an upstream region 106 of the platform interior side 86 may be removed. This upstream region 106 of FIG. 7B extend axially to the fairing leading edge 82 and laterally between the fairing sides 76. Referring to FIG. 7C, the exterior coating material at/along each fairing lateral edge 92 may also be removed.

The exterior coating 96 and its exterior coating material may be removed using an abrasive. The exterior coating material, for example, may be removed via sandpaper and/or a grinding tool.

In step 604, the rotor fairing 66 is dried to remove moisture.

Figure 8:
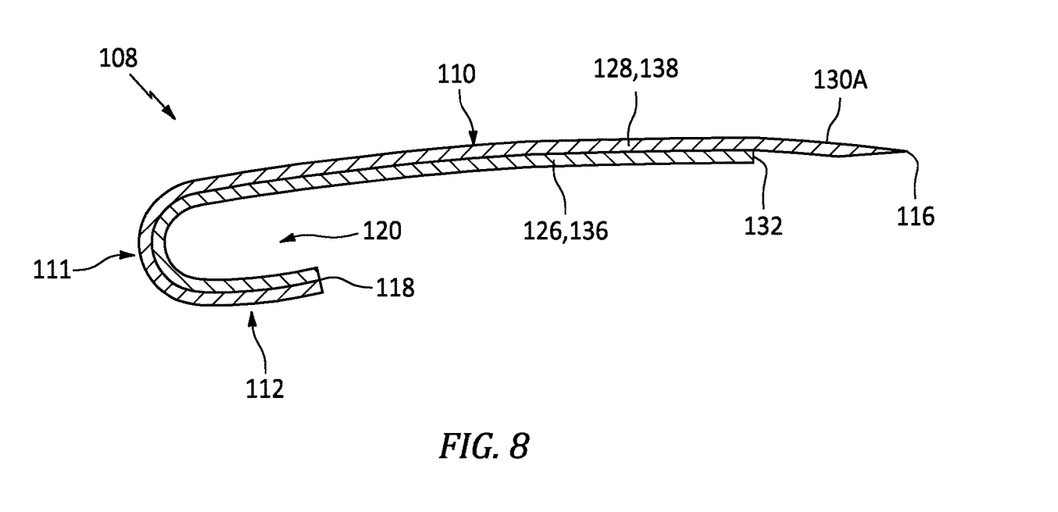
FIG. 8 is a side sectional illustration of a repair detail for the fan rotor fairing.
Figure 9:
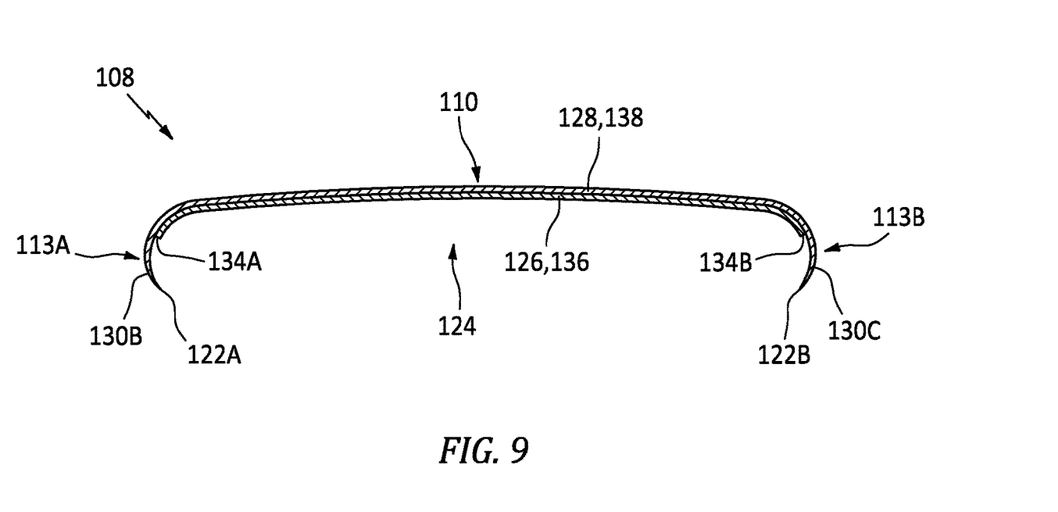
FIG. 9 is a cross-sectional illustration of the repair detail.

In step 606, a repair detail 108 is provided. Referring to FIGS. 8 and 9, this repair detail 108 may be configured as a shield, a cover, a patch, etc. for the rotor fairing 66 (see FIGS. 7A-c). Referring to FIG. 8, the repair detail 108 includes a base 110, a leading edge wall 111 and a flange 112. Referring to FIG. 9, the repair detail 108 also includes a first lateral edge wall 113A and a second lateral edge wall 113B.

The detail base 110 of FIG. 8 extends longitudinally (e.g., axially) from an aft, downstream end 116 of the repair detail 108 to the detail leading edge wall 111. The detail base 110 of FIG. 9 extends laterally between and to the detail lateral edge walls 113A and 113B (generally referred to as "113").

Referring to FIG. 8, the detail leading edge wall 111 extends vertically between and is connected to (e.g., formed integral with) the detail base 110 and the detail flange 112. The detail flange 112 projects longitudinally out from the detail leading edge wall 111 to a distal edge 118. The detail flange 112 also longitudinally and laterally overlaps at least a forward, upstream portion of the detail base 110. With this configuration, the repair detail 108 may have a hooked (e.g., J-shaped) sectional geometry when viewed, for example, in a plane perpendicular to the repair detail elements 110-112 (e.g., plane of FIG. 8) and/or generally parallel with the detail lateral edge walls 113. The repair detail 108 may thereby include a channel 120. This channel 120 projects longitudinally into the repair detail 108 from the flange distal edge 118 and an intermediate location along the detail base 110 to the detail leading edge wall 111. The channel 120 may extend laterally through (or within) the repair detail 108. The channel 120 extends vertically within the repair detail 108 between and to the detail base 110 and the detail flange 112.

Referring to FIG. 9, each detail lateral edge wall 113 is connected to (e.g., formed integral with) and projects vertically (e.g., radially inward) from the detail base 110 to a respective distal edge 122A, 122B (generally referred to as "122"). The detail first lateral edge wall 113A longitudinally and vertically overlaps the detail second lateral edge wall 113B. With this configuration, the repair detail 108 may have a channeled (e.g., U or C shaped) sectional geometry when viewed, for example, in a plane perpendicular to the repair detail elements 110 and 113 (e.g., plane of FIG. 9) and/or generally parallel with the detail leading edge wall 111. The repair detail 108 may thereby include a channel 124. This channel 124 projects vertically into the repair detail 108 from the wall distal edges 122 to the detail base 110. The channel 124 may extend longitudinally through (or into) the repair detail 108. The channel 124 extends laterally within the repair detail 108 between and to the detail lateral edge walls 113.

The repair detail 108 of FIGS. 8 and 9 is configured with a (e.g., monolithic) repair detail body. This detail body includes a carrier 126 and an exterior layer 128. The carrier 126 is configured to support the exterior layer 128 during manufacture. The exterior layer 128 is configured as a replacement section of the exterior coating 96 for the rotor fairing 66. Dimensions of the carrier 126 may be sized smaller than corresponding dimensions of the exterior layer 128 to provide the exterior layer 128 with one or more (e.g., carrier-unsupported) overhang portions 130A-C (generally referred to as "130"). The aft, downstream overhang portion 130A of FIG. 8, for example, projects longitudinally out from an aft, downstream end 132 of the carrier 126 to the downstream end 116. Each side overhang portion 130B, 130C of FIG. 9 projects vertically out from a respective distal side 134A, 134B of the carrier 126 to the respective wall distal edge 122A, 122B.

The carrier 126 is formed from (e.g., cured) carrier material 136. This carrier material 136 may be fiber-reinforced composite material such as, but not limited to, fiberglass within a resin matrix. The exterior layer 128 is formed from a polymeric exterior layer material 138; e.g., erosion coating material. This exterior layer material 138 may be a fluoropolymer and, more particularly, a fluoropolymer elastomer and synthetic rubber compound such as, but not limited to, Viton™ material produced by Dupont of Wilmington, Delaware, United States. The present disclosure, however, is not limited to the foregoing exemplary rotor repair detail materials.

Figure 10:
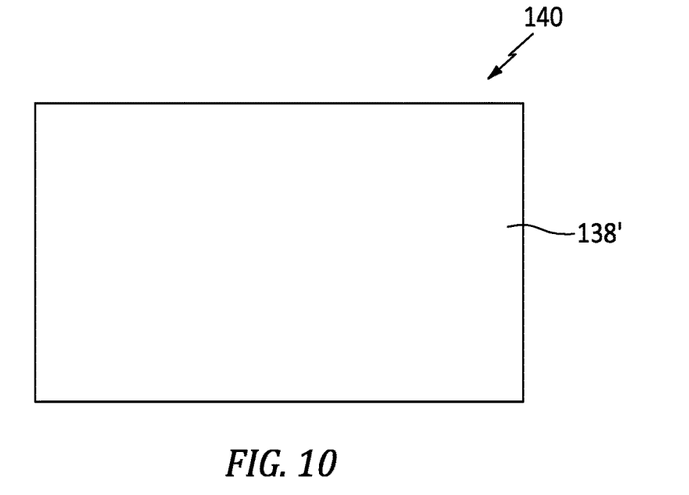
FIG. 10 is a schematic illustration of a sheet of exterior layer material.
Figure 11:
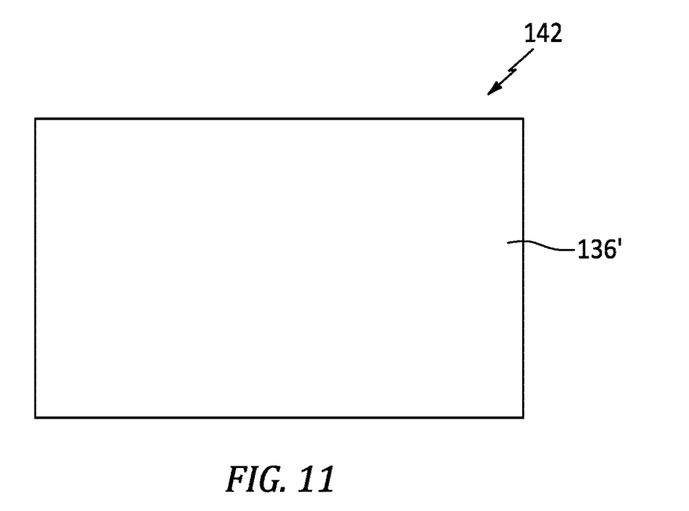
FIG. 11 is a schematic illustration of a sheet of carrier material.
Figure 12:
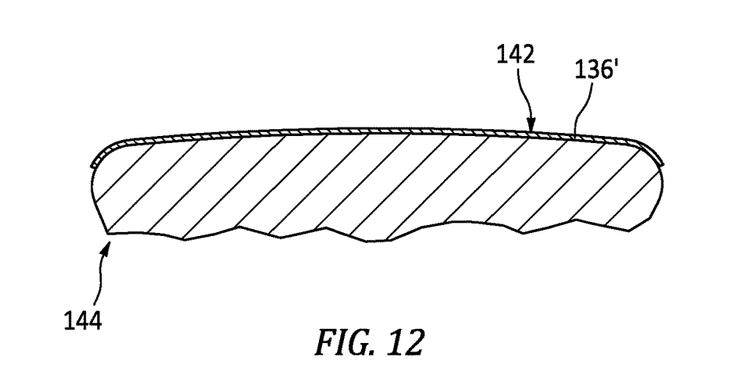
FIG. 12 is a partial cross-sectional illustration of the carrier material disposed on a repair detail mold.
Figure 13A:
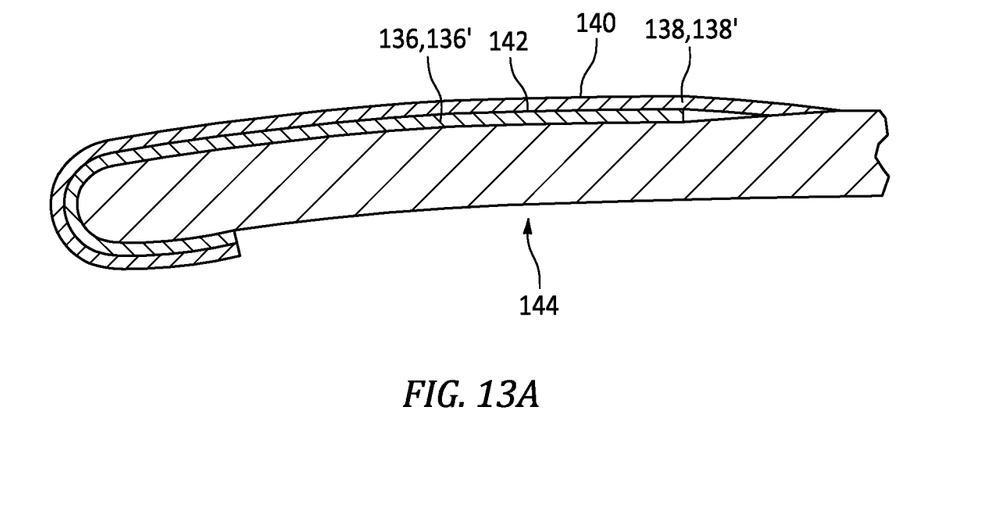
FIG. 13A is a partial side sectional illustration of the carrier material and the exterior layer material disposed on the repair detail mold.
Figure 13B:
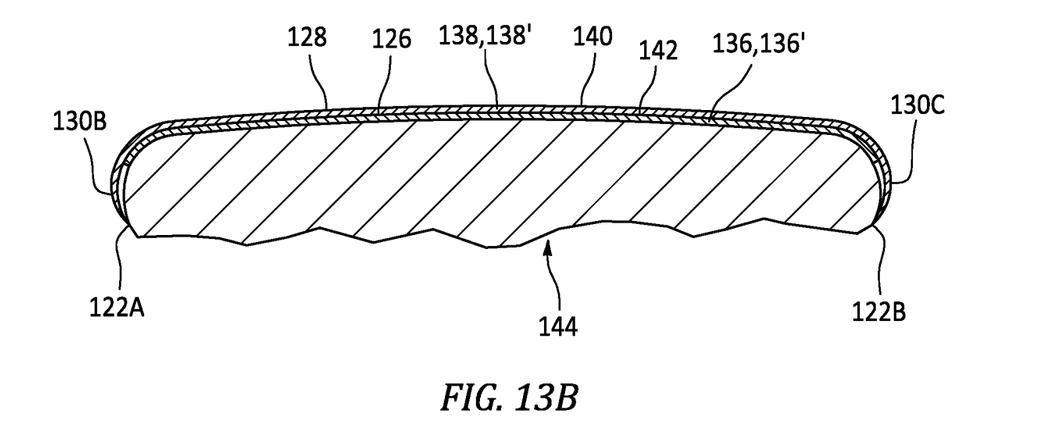
FIG. 13B is a partial cross-sectional illustration of the carrier material and the exterior layer material disposed on the repair detail mold.

Referring to FIG. 10, the repair detail 108 of FIGS. 8 and 9 may be formed by providing at least one sheet 140 (e.g., a ply, etc.) of the exterior layer material in an uncured (e.g., completely uncured or partially cured) form ("uncured exterior layer material"). Referring to FIG. 11, at least one sheet 142 (e.g., a ply, etc.) of the carrier material is provided in an uncured (e.g., completely uncured or partially cured) form ("uncured carrier material"). Referring to FIG. 12, the sheet 142 of uncured carrier material 136' is disposed on a repair detail mold 144. Referring to FIGS. 13A and 13B, the sheet 140 of uncured exterior layer material 138' is disposed over the sheet 142 of uncured carrier material 136' and the mold 144. A central portion of the uncured exterior layer material 138' may thereby overlap and engage (e.g., contact) the uncured carrier material 136'. One or more side portions of the uncured exterior layer material 138' may overlap and engage (e.g., contact) the mold 144. The assembly of elements 140 and 142 is pressed against the mold 144 using, for example, a vacuum bag system. The assembly of elements 140 and 142 is further subjected to a cure cycle; e.g., elevated temperature for a period of time. This cure cycle cures the uncured carrier material 136' to provide the (e.g., cured) carrier material 136. The cure cycle cures the uncured exterior layer material 138' to provide the (e.g., cured) exterior layer material 138. Resin from the uncured carrier material 136' may also infiltrate into and/or otherwise interact with the uncured exterior layer material 138' during the curing to bond the exterior layer material 138 to the carrier material 136. The now formed (e.g., cured) repair detail 108 may be released from the mold 144 for further processing. Note, providing the overhang portion may facilitate release from the mold 144 since the cured exterior layer material 138 may be relatively flexible. Release material may also or alternatively be applied, for example, to the mold 144 prior to disposing the sheets 140 and 142 onto the mold 144 to further facilitate release of the repair detail 108 from the mold 144.

In step 608, the repair detail 108 is prepared for bonding. For example, referring to FIGS. 8 and 9, one or more exposed surfaces of the carrier material 136 may be roughened up; e.g., sanded. These surfaces may also or alternatively be cleaned with a solvent. One or more exposed surfaces of the exterior layer material 138 may be smoothed out; e.g., polished.

In step 610, the rotor fairing 66 is prepared for bonding. For example, referring to FIGS. 7A-C, one or more exposed surfaces of the rotor fairing 66 may be roughened up; e.g., sanded. These surfaces may also or alternatively be cleaned with a solvent.

In step 612, an adhesive 146 is disposed with the rotor fairing 66. For example, referring to FIGS. 14A and 14B, the adhesive 146 may be applied onto one or more surfaces of the rotor fairing 66. The adhesive 146 of FIGS. 14A and 14B, for example, is applied onto the exposed intermediate member material. The adhesive 146 is also applied onto the exterior coating 96 at least partially along a periphery of the exposed intermediate member material.

In step 614, the repair detail 108 is arranged with the rotor fairing 66. For example, referring to FIGS. 14A and 14B, the repair detail 108 is slipped onto the rotor fairing 66 such that the fairing platform 80 projects longitudinally into the channel 120 of FIG. 14A (see also FIG. 8) and the fairing platform 80 is received within the channel 124 of FIG. 14B (see also FIG. 9). With this arrangement, the adhesive 146 is (e.g., completely) between the repair detail 108 and the rotor fairing 66.

Figure 14A:
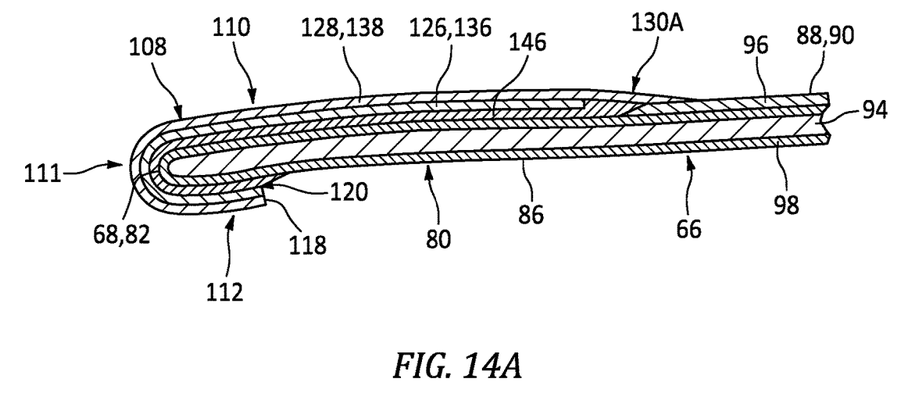
FIG. 14A is a partial side sectional illustration of the repair detail arranged with the fan rotor fairing.
Figure 14B:
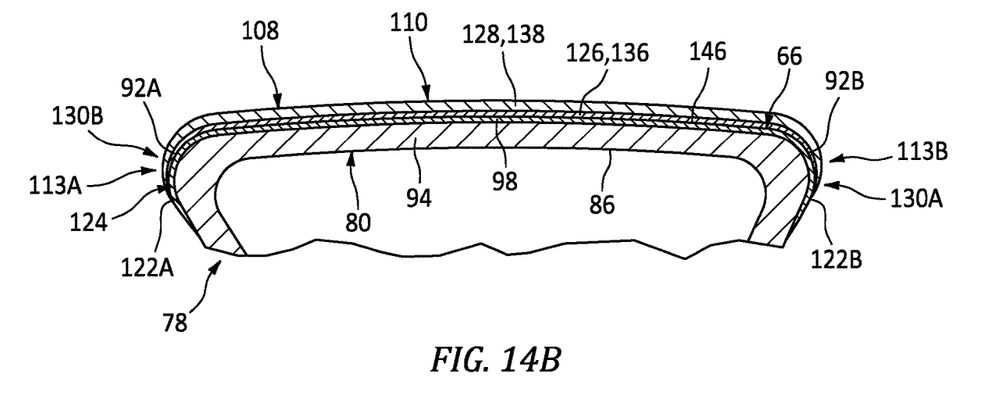
FIG. 14B is a partial cross-sectional illustration of the repair detail arranged with the fan rotor fairing.

Referring to FIG. 14A, the detail base 110 overlaps and covers a portion of the platform exterior side 88. The detail leading edge wall 111 overlaps and covers the fairing leading edge 82. The detail flange 112 overlaps and covers a portion of the platform interior side 86. Referring to FIG. 14B, each detail lateral edge wall 113 overlaps and covers the fairing lateral edge 92 as well as a portion of the fairing mount 78.

In step 616, the repair detail 108 is pressed against the rotor fairing 66. The repair detail 108, for example, may be pressed against the rotor fairing 66 using, for example, a vacuum bag system.

In step 618, the assembly of elements 66, 126, 128 and 146 are subjected to a cure cycle; e.g., elevated temperature for a period of time. This cure cycle, however, may involve lower temperatures than the cure cycle for forming the repair detail 108. The elevated temperatures of the cure cycle of the step 618 may thereby not degrade the already cured material of the rotor fairing 66 and/or the repair detail 108. During this cure cycle, the adhesive 146 may interact with the repair detail 108 and the rotor fairing 66 and cure, thereby bonding the repair detail 108 to the rotor fairing 66. More particularly, the carrier material 136 is bonded to the intermediate member material by the adhesive 146. The overhang portions 130 of the exterior layer material 138 are also bonded to the intermediate member material by the adhesive 146. The overhang portion 130 may also be bonded to a portion of the exterior coating 96.

In step 620, the now repaired (e.g., patched) rotor fairing 66 of FIGS. 14A and 14B may undergo one or more finishing operations. Examples of the finishing operations include, but are not limited to, sanding, polishing, cleaning, faring, etc.

Figure 15:
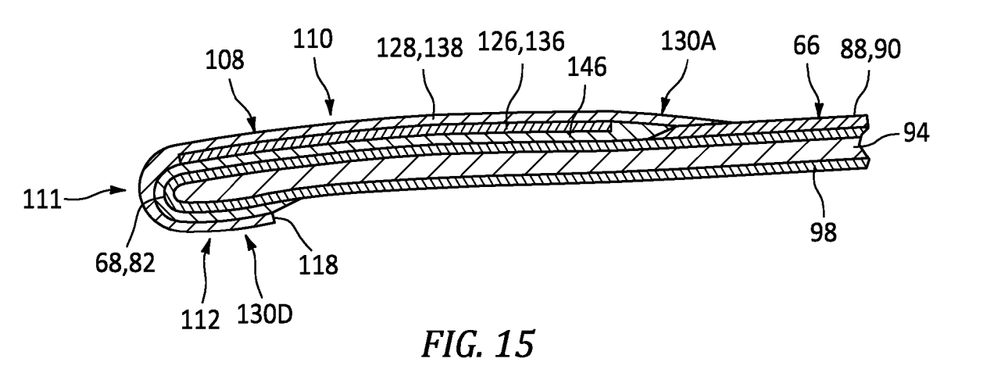
FIG. 15 is a partial side sectional illustration of another repair detail arranged with the fan rotor fairing.

In some embodiments, referring to FIG. 15, the repair detail 108 may also or alternatively include a forward, upstream overhang portion 130D of the exterior layer material 138 to at least partially (or completely) form the detail leading edge wall 111 and/or the detail flange 112. Provision of this overhang portion 130D may further facilitate release from the mold 144 during the step 606.

Figure 16:
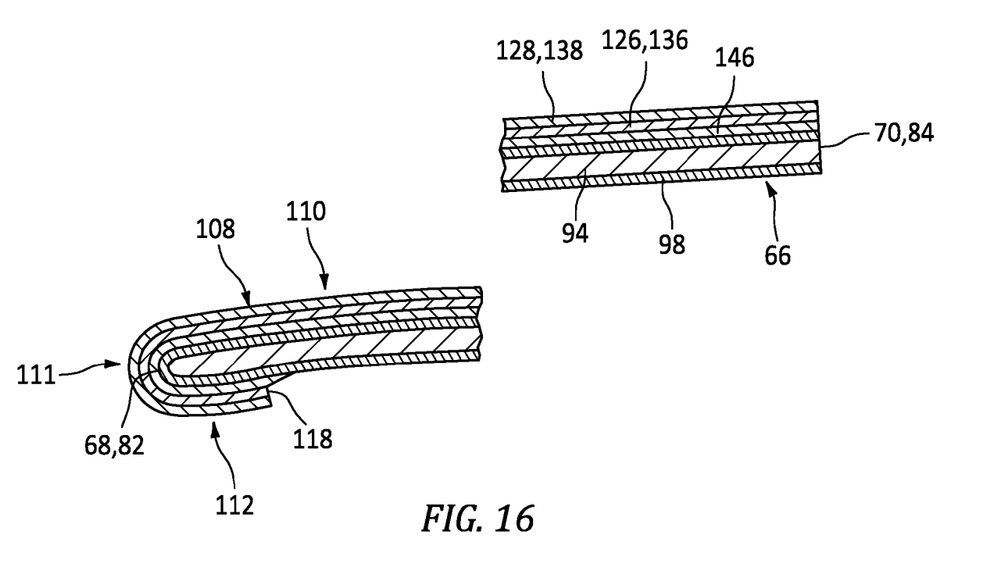
FIG. 16 is a partial side sectional illustration of another repair detail arranged with the fan rotor fairing.

In some embodiments, referring to FIG. 16, the repair detail 108 may be configured to axially and/or laterally cover the entire platform exterior side 88.

In some embodiments, the material for the repair detail 108 may be trimmed before the curing of the repair detail 108. However, the material for the repair detail 108 may also or alternatively be trimmed following the curing of the repair detail 108.

The detail 108 is described above with reference to a method for repairing the rotor fairing 66. However, it is also contemplated that such a detail may be affixed to the rotor fairing 66 during initial manufacture as a replaceable element. The present disclosure therefore is not limited to repairing the rotor fairing 66.

Figure 17:
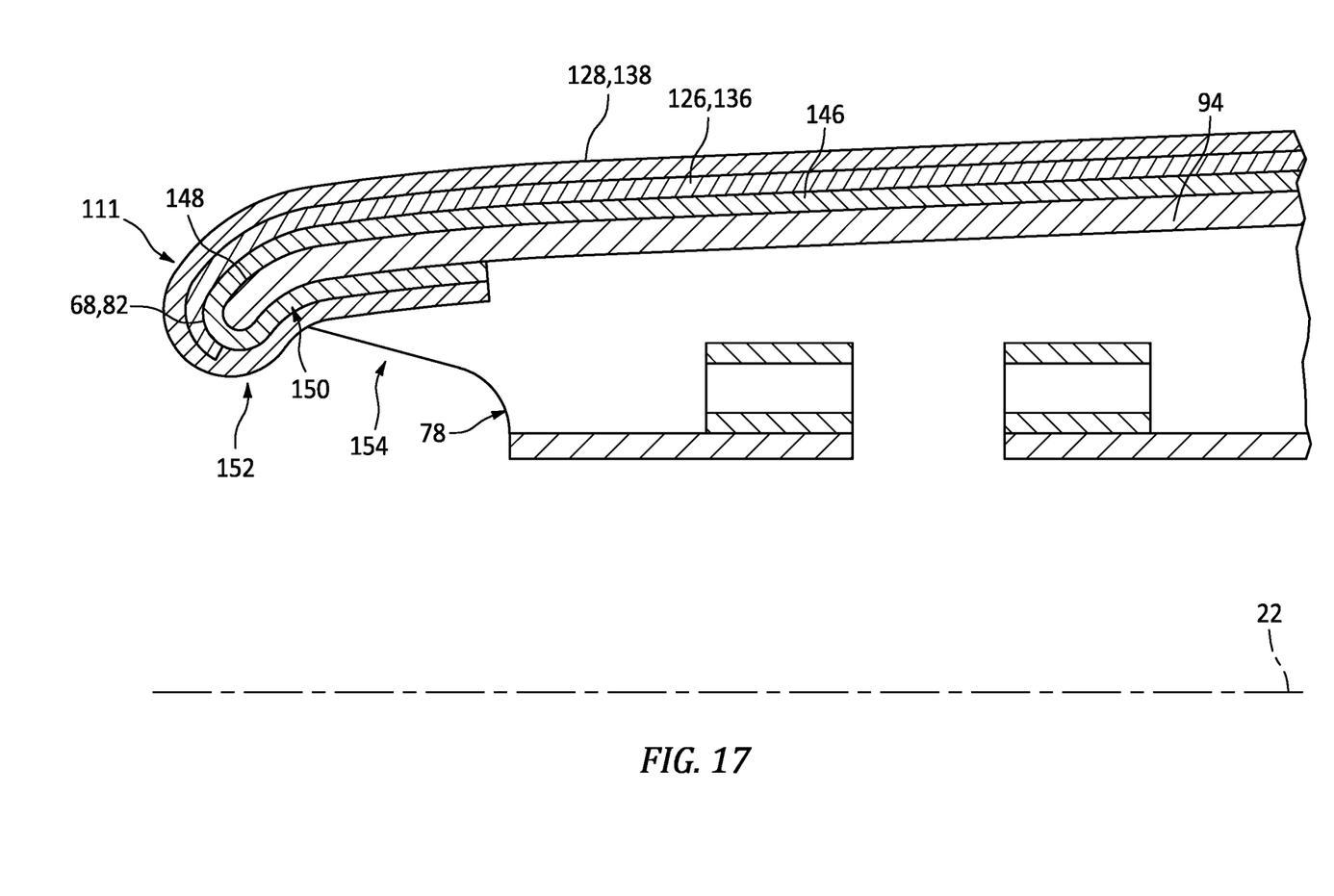
FIG. 17 is a partial side sectional illustration of another repair detail arranged with the fan rotor fairing.

In some embodiments, referring to FIG. 17, the carrier 126 and its carrier material 136 may extend partially about the fairing upstream end 68. An end of the carrier 126 of FIG. 17, for example, is located at (e.g., on, adjacent or proximate) the fairing leading edge 82; e.g., slightly aft and radially inward of the fairing leading edge 82.

In some embodiments, the fairing base 94 may be configured with a compound curve when viewed, for example, in a reference plane (e.g., plane of FIG. 17) parallel with and/or coincident with the axial centerline 22. An exterior surface 148 of the fairing base 94 of FIG. 17, for example, has a curved, convex profile about the fairing upstream end 68/the fairing leading edge 82. However, along a region 150 adjacent and aft of the fairing upstream end 68, the exterior surface 148 has a curved, concave profile. The fairing base 94 of FIG. 17 thereby has a turn-down region 152 at the fairing upstream end 68/the fairing leading edge 82. This turn-down region 152 may be axially forward of and/or axially overlapped by a forward portion 154 of the inner fairing mount 78.

The rotor fairing 66 may be included in various turbine engines other than the one described above. The rotor fairing 66, for example, may be included in a geared turbine engine where a gear train connects one or more shafts to one or more rotors in a fan section, a compressor section and/or any other engine section. Alternatively, the rotor fairing 66 may be included in a turbine engine configured without a gear train. The rotor fairing 66 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. A method for a fairing for a turbine engine, the method comprising:
   providing a detail, the detail including a carrier and an exterior layer bonded to the carrier, the carrier comprising a sheet of fiber-reinforced composite material, and the exterior layer comprising a sheet of polymer material;
   disposing adhesive with the fairing;
   arranging the detail with the fairing, the fairing including an exterior side and an edge, the detail covering and extending along at least a portion of the exterior side, and the detail wrapping at least partially around the edge; and
   bonding the carrier and at least a first overhang portion of the exterior layer to the fairing, wherein the adhesive is between the fairing and the detail, and the bonding comprises curing the adhesive to bond the detail to the fairing;
   wherein the providing of the detail comprises:
      disposing a sheet of uncured fiber-reinforced composite material on a mold;
      disposing a sheet of uncured polymer material over the sheet of uncured fiber-reinforced composite material; and
      subjecting an assembly of the mold, the sheet of uncured polymer material and the sheet of uncured fiber-reinforced composite material to a cure cycle to
         bond the sheet of uncured polymer material to the sheet of uncured fiber-reinforced composite material;
         cure the sheet of uncured polymer material; and
         cure the sheet of uncured fiber-reinforced composite material.

2. The method of claim 1, wherein
   the fairing further includes an interior side located opposite the exterior side; and
   the detail extends around the edge from the exterior side to the interior side.

3. The method of claim 2, wherein the detail covers and extends along at least a portion of the interior side.

4. The method of claim 3, wherein the carrier is bonded to the exterior side and the interior side.

5. The method of claim 3, wherein
   the carrier is bonded to the exterior side; and
   the first overhang portion of the exterior layer is bonded to the interior side.

6. The method of claim 1, wherein the carrier is bonded to the exterior side and the edge.

7. The method of claim 1, wherein
   the carrier is bonded to the exterior side; and
   the first overhang portion of the exterior layer is bonded to the edge.

8. The method of claim 1, wherein
   the carrier is bonded to the exterior side; and
   the first overhang portion of the exterior layer is bonded to the exterior side.

9. The method of claim 1, wherein
   the first overhang portion of the exterior layer projects past an end of the carrier and covers and is bonded to an exterior surface region of the fairing adjacent the edge; and
   the exterior surface region has a concave curvature.

10. The method of claim 1, wherein
    the edge is a leading edge of the fairing, and the fairing further includes a first lateral edge and a second lateral edge located opposite the first lateral edge; and
    the detail wraps at least partially around the first lateral edge and the second lateral edge.

11. The method of claim 1, wherein the fairing is configured as a platform segment for the turbine engine.

12. The method of claim 1, further comprising:
    arranging the fairing laterally between a first fan blade and a second fan blade;
    the fairing forming a platform segment of a fan rotor.

13. The method of claim 1, wherein at least one of
    the fiber-reinforced composite material comprises fiberglass within a resin matrix; or
    the polymer material comprises flouroelastomer material.

14. A method, the method comprising:
    disposing carrier material on a mold, the carrier material comprising uncured fiber-reinforced composite material;
    disposing exterior layer material over the carrier material to provide an assembly, the exterior layer material comprising uncured polymer material;
    subjecting the assembly to a cure cycle to
       bond the exterior layer material to the carrier material;
       cure the uncured fiber-reinforced composite material to provide fiber-reinforced composite material; and
       cure the uncured polymer material to provide polymer material;
    wherein the fiber-reinforced composite material forms a carrier of a detail for a fairing for a turbine engine, the polymer material forms an exterior layer of the detail, and the detail is configured with a hooked sectional geometry;
    disposing adhesive with the fairing;
    arranging the detail with the fairing, the detail wrapping at least partially around a leading edge of the fairing; and
    bonding the fiber-reinforced composite material and at least a portion of the polymer material to the fairing, wherein the adhesive is between the fairing and the fiber-reinforced composite material, and the bonding comprises curing the adhesive to bond the fiber-reinforced composite material to the fairing.

15. The method of claim 14, wherein a portion of the exterior layer projects out from and is unsupported by the carrier.

* * * * *